US007634761B2

(12) United States Patent
Buschardt et al.

(10) Patent No.: US 7,634,761 B2
(45) Date of Patent: Dec. 15, 2009

(54) BREAKPOINT LOGGING AND CONSTRAINT MECHANISMS FOR PARALLEL COMPUTING SYSTEMS

(75) Inventors: Cameron S Buschardt, Bellevue, WA (US); John A Cunningham, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 564 days.

(21) Appl. No.: 10/977,416

(22) Filed: Oct. 29, 2004

(65) Prior Publication Data

US 2006/0101405 A1    May 11, 2006

(51) Int. Cl.
    G06F 9/44    (2006.01)
(52) U.S. Cl. ............... 717/129; 717/128; 717/130; 717/131
(58) Field of Classification Search .......... 717/124–135
    See application file for complete search history.

(56) References Cited

U.S. PATENT DOCUMENTS 6,684,359 B2 *  1/2004  Noy ..................... 714/741

OTHER PUBLICATIONS

Lee et al., "A Development of Remote Tracepoint Debugger for Run-time Monitoring and Debugging of Timing Constraints on Qplus-P RTOS", IEEE Workshop on Software Technologies for Future Embedded Systems, pp. 1-4, 2003.*

* cited by examiner

*Primary Examiner*—Ted T Vo
(74) *Attorney, Agent, or Firm*—Workman Nydegger (57) ABSTRACT

A system that facilitates debugging of a computing cluster and/or distributed applications environment. A debugger component receives a debugging expression, and a constraint component includes both a static constraint engine (SCE) and a dynamic constraint engine (DCE) processes the debugging expression to automatically perform a debugging process on at least two processes of a plurality of processes. When the user creates a tracepoint or constraint breakpoint the expression is sent directly to the SCE, which parses the constraint and tracepoint expressions, reduces the expression by evaluating parts of the expression based on static values (such as process ID or filename), and passes the remainder on to each of the applicable DCEs. The DCEs register a breakpoint at the applicable location in the process, and upon receiving a breakpoint event, evaluates the remainder of the constraint expression on the dynamic data, and sends log and/or break event data back to the user for viewing.

22 Claims, 10 Drawing Sheets

BREAKPOINT LOGGING AND CONSTRAINT MECHANISMS FOR PARALLEL COMPUTING SYSTEMS

TECHNICAL FIELD

This invention is related to software debugging architectures, and more specifically, to debugging in parallel processing or cluster computing systems.

BACKGROUND OF THE INVENTION

Cluster computing is becoming an increasingly important type of computing as high performance computing gains in importance through the various domains it touches from scientific computing to financial computing to entertainment and manufacturing, to name but a few.

Cluster computing systems allow multiple computing nodes to work together in accomplishing a computational task. The cluster presents a unified system image, such that a client looking into the cluster does not see any single node of the cluster, rather the whole cluster system. The plurality of computing nodes is typically connected through one or more computing networks such that each node in the cluster is capable of communicating with every other cluster node. The computers in a cluster typically share a disk, a disk array, or other nonvolatile mass storage subsystems, such as RAM drives. Computers that are merely networked, such as clients of the Internet or LAN, are not considered a cluster because they necessarily appear to users as a collection of connected computers rather than a single computing system. "Users" in this context can include both human users and application programs, and which programs include tasks, threads, processes, routines, and other interpreted or compiled software.

Although every node in a cluster can be the same type of computer, a major advantage of clusters is the support for heterogeneous nodes. As the computing power available in all types of computing devices continues to increase, it is entirely possible that a cluster could include computing systems such as a graphics workstation, diskless computer, laptop, a symmetric multiprocessor, and multiple versions of servers.

In a computing cluster, it must be possible to run an application program on the cluster without requiring that the application program distribute itself between the nodes. This is accomplished in part by providing cluster system software that manages use of the cluster nodes by application programs. But such complex software systems are not without implementation and operational complexities. Software errors, omissions, or incompatibilities may bring to a halt (or crash) any useful processing on a node. The goal of maintaining cluster availability dictates rapid detection of the crash and rapid compensation by either restoring the node or proceeding without it. Detection and compensation may be performed by cluster system software or by a cluster-aware application.

Debuggers may also be used by programmers to identify the source of certain problems. Currently, there are no great parallel debuggers. Moreover, conventional debugging breakpoints are not suited to debugging large scale cluster and deployed applications. Traditional debugging includes putting breakpoints everywhere using a special command string that is fairly arcane, and which could be looked at dynamically by completely stopping the program and running some sort of macro that logs information and then allows the program or process to continue execution. However, application of such techniques on parallel processes can severely impact operation of the cluster. Accordingly, there is an unmet need for an improved debugging mechanism in cluster computing system and/or distributed applications environment.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

In this patent a mechanism is presented to allow more precise control of breakpoints and their resulting actions to facilitate debugging in a computing cluster. This is different from other mechanisms where complex command structures are required to emulate this functionality.

The invention disclosed and claimed herein, in one aspect thereof, comprises a system that facilitates debugging of a computing cluster and/or a distributed applications environment. A debugger component receives a debugging expression, and a constraint component that includes both a static constraint engine (SCE) and a dynamic constraint engine (DCE) processes the debugging expression to automatically perform a debugging process on at least two processes of a plurality of processes. When the user creates a tracepoint or constraint breakpoint the expression is sent directly to the SCE, which parses the constraint and tracepoint expressions, reduces the expression by evaluating parts of the expression based on static values (such as process ID or filename), and passes the remainder on to each of the applicable DCEs. The DCEs register a breakpoint at the applicable location in the process and upon receiving a breakpoint event, evaluate the remainder of the constraint expression on the dynamic data and send log and/or break event data back to the user for viewing.

In another aspect of the subject invention, when the user creates a tracepoint or constraint breakpoint the expression is sent directly to the SCE. The SCE is responsible for parsing the constraint and tracepoint expressions, reducing the expression by evaluating parts of the expression based on static values, and passing the remainder on to each of the applicable DCE(s). The DCE(s) correspond directly to each user process (being debugged). Once the DCE receives a constraint, it registers a normal breakpoint at the applicable location in the process. Whenever the DCE receives a breakpoint event back from the process, it evaluates the remainder of the constraint expression on the dynamic data (such as thread ID, call-stack location, and user variables). The result of this evaluation determines what log data to send to the UI and whether the break information is shown to the user or ignored.

In another aspect of the subject invention, not all breakpoints are passed from the SCE to each DCE. The SCE is responsible for evaluating the expression, and treating as ambiguous any term relying on a variable whose value is not yet known (such as thread ID). As a result, the SCE generates may-break/must-break/must-not-break information, and only forwards the breakpoint to the DCE if it cannot be determined that the breakpoint would not be reachable. This provides scalability, since the user processes are not unduly interrupted.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Cluster Computing Debugging Architecture

The breakpoint logging and constraint features of the subject invention provide improved cluster and distributed applications debugging. The constraint feature allows a user to define debugging on a specific piece of code and on certain cluster and/or distributed applications nodes (or machines). As described herein, it is to be appreciated that the subject invention applies to both cluster and distributed applications environments. In contrast to conventional debuggers that included putting breakpoints everywhere using a special command string that was fairly arcane, and which could be looked at dynamically, the constraint feature of the invention adds a more efficient method so that the user can provide an expression for each breakpoint in a process that is related to a specific machine, and the threads inside each process (the process being the program). Moreover, the debugger determines for each loaded instance of the program (a parallel application running on several machines) in the cluster, if that expression would be satisfiable (would it ever be true for that process). If the expression would never be true for a given process, it would never bind into that program.

Another feature is tracepoint logging. If the cluster runs a highly-threaded program, where stopping and stepping in the debugger could change the overall operational behavior of the program in some way, a constraint mechanism can be placed right into the engine of the debugger to only log information about particular points in the program, rather than stopping the program. This minimizes the impact on program timing mechanisms. Traditionally, this has been done by completely stopping the program and running some sort of macro that logs information, and then releasing the program for execution. The disclosed tracepoint feature facilitates quick interruption of the program, logging of information, and release of the program for continuing execution. Thus, in contrast to conventional debugging methods that stop the program, returns the breakpoint event information back to a higher user level for a user decision to be made, the decision-making of the subject invention operates at a much lower level to simply dump the information as a log, and analyze as the log at a later time, thereby reducing the program downtime or interruption.

Figure 1:
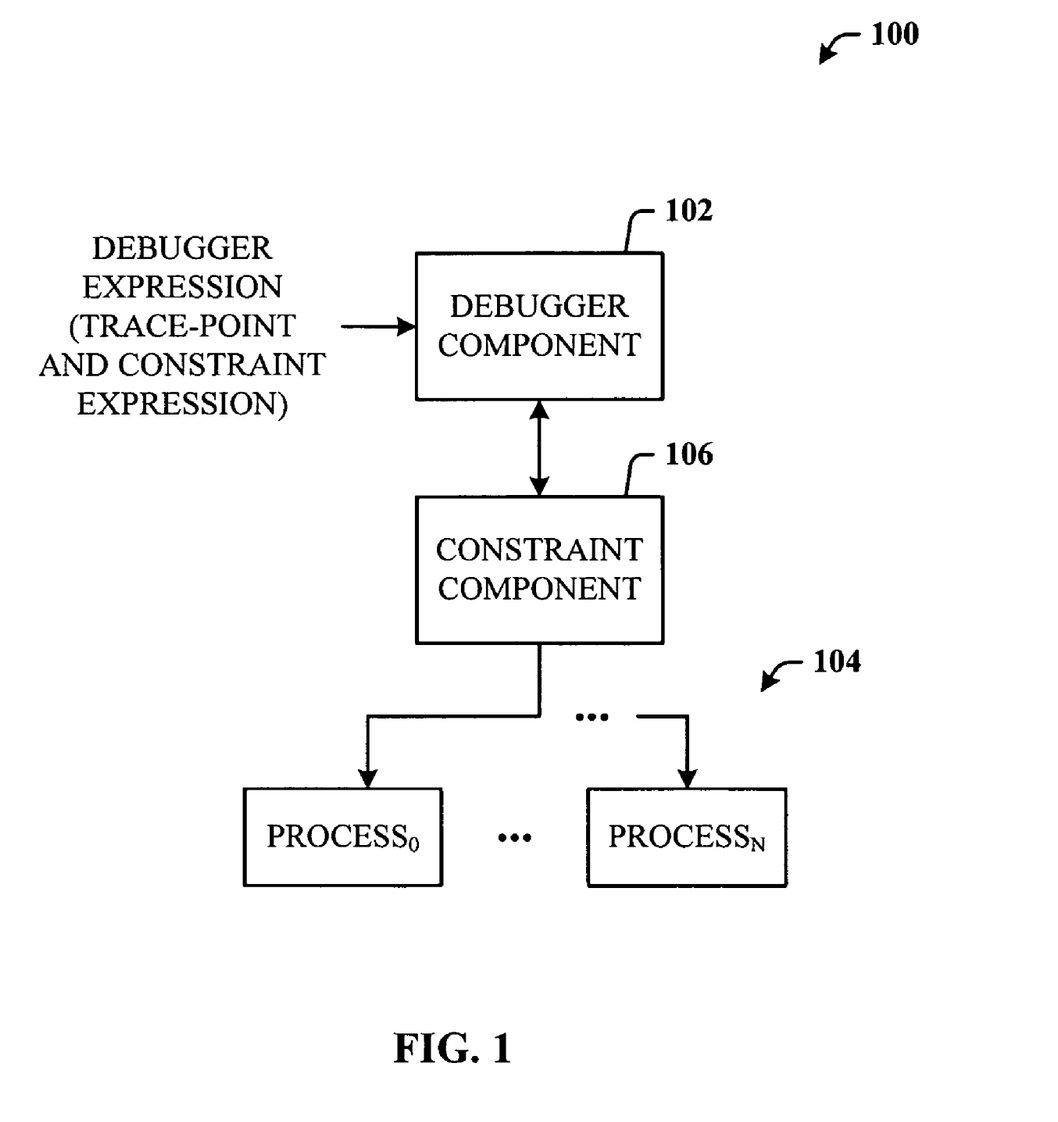
FIG. 1 illustrates a system that facilitates cluster computing and distributed applications debugging in accordance with the subject invention.

Referring now to FIG. 1, there is illustrated a system 100 that facilitates cluster computing and distributed applications debugging in accordance with the subject invention. The system 100 includes a debugger component 102 that receives a debugging expression which can include at least one of tracepoint information and constraint information, and that defines how one or more processes 104 (denoted $PROCESS_0$, ..., $PROCESS_N$) will be processed during a debugging session. In accordance with cluster computing, it is to be appreciated by one skilled in the art that the processes 104 can be distributed across a plurality of machines (or computing devices), with one or more of the processes on each of the plurality of machines. The debugging expression in the form of the tracepoint and constraint expression is the means by which a user interfaces to the debugger component 102 to express the desire to stop and/or log information about a point in a program, and/or also constrain the program to particular processes, particular machines, and/or threads of execution.

A constraint component 106 interfaces to the debugger component 102 to parse the debugging expression, statically evaluate as much information as possible from the debugging expression, and send remaining portions of the expression to corresponding machines and associated processes 104.

Figure 2:
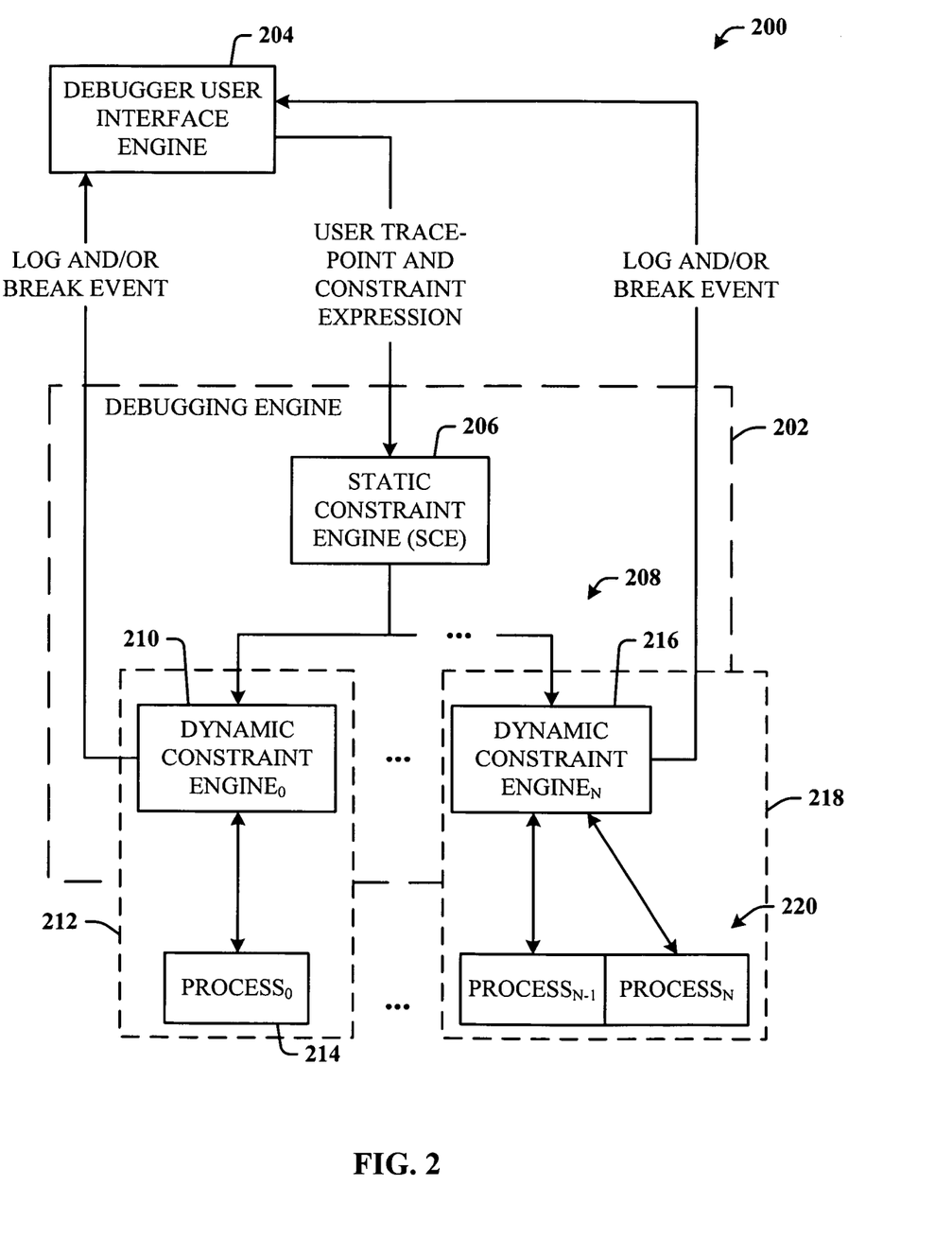
FIG. 2 illustrates a more detailed diagram of a system that facilitates cluster computing and distributed applications debugging in accordance with the subject invention.

Referring now to FIG. 2, there is illustrated a system 200 that facilitates cluster computing and distributed applications debugging in accordance with the subject invention. The system 200 includes a debugging engine 202 (similar to the debugger component 102 of FIG. 1) that receives the debugger expression (as the tracepoint and constraint expression) from a debugger UI (user interface) engine 204 and transmits log and/or break event data back to the debugger UI engine 204. In this implementation, the debugging engine 202 comprises constraint components in the form of a static constraint engine (SCE) 206 and a plurality of dynamic constraint engines (DCEs) 208 (denoted DYNAMIC CONSTRAINT ENGINE$_0$, . . . ,DYNAMIC CONSTRAINT ENGINE$_N$, where N is an integer) that interface to the SCE 206.

In support of cluster computing debugging in accordance with the invention, at least one of the plurality of DCEs 208 is local to a cluster machine (or cluster node). This is represented by a first DCE 210 (denoted DCE$_0$ associated with a first machine 212, which first machine 212 has at least one process 214 (denoted PROCESS$_0$) running thereon. The debugging engine 202 also associates with a number of other DCEs, including an Nth DCE 216 (denoted DCE$_N$) of an Nth machine 218 that has two or more processes 220 running thereon (denoted as . . . ,PROCESS$_{N-1}$,PROCESS$_N$, . . . ). This particular implementation illustrates one DCE for one machine. However, it is to be appreciated that a single machine (e.g., machine 218) may be associated with at least two DCEs 208. This finds application where the machine is running 32-bit processes and 64-bit processes, for example. Thus, one DCE is dedicated to the 32-bit processes, and the other DCE to the 64-bit processes.

When the user creates a tracepoint or constraint breakpoint expression via the debugger UI engine 204, the expression is sent directly to the SCE 206. The SCE 206 is responsible for parsing the constraint and tracepoint expression, reducing the expression by evaluating parts of the expression based on static values (e.g., process ID or filename), and passing the remaining parts on to each of the applicable DCEs.

The DCEs correspond directly to each user process (being debugged). Once the DCE (e.g., DCE 210) receives a constraint, it registers a normal breakpoint at the applicable location in the process (e.g., process 214). Whenever the DCE 210 receives a breakpoint event, it evaluates the remainder of the constraint expression on the dynamic data (e.g., thread ID, call-stack location, and user variables). The result of this evaluation determines what log data to send to the UI engine 204 and whether the breakpoint event is shown to the user or ignored.

It is noted that not all breakpoints are passed from the SCE 206 to every DCE 208. The SCE 206 is responsible for evaluating the expression and treating as ambiguous any term that relies on a variable whose value is not yet known (such as thread ID). As a result, the SCE 206 generates may-break/must-break/must-not-break information. The SCE 206 only forwards the breakpoint to the DCE (e.g., DCE 210) if the SCE 206 cannot determine that the breakpoint would not be reachable. This feature provides scalability, since as a result, the user processes 214 are not unduly interrupted. Thus, the parallel debugging experience of the subject invention uses little or no support from parallel message passing library vendors.

Figure 3:
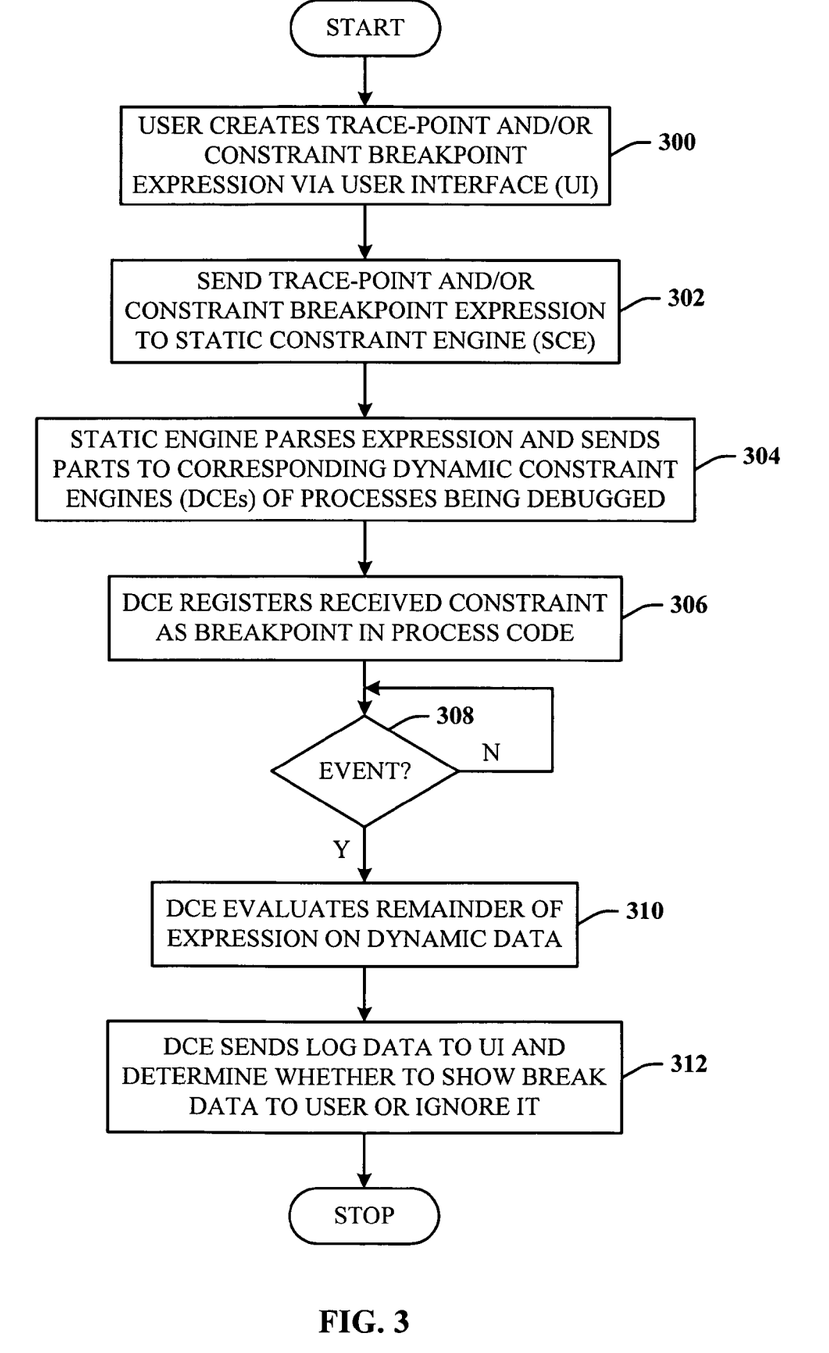
FIG. 3 illustrates a flow chart of one methodology for cluster debugging and distributed applications in accordance with the invention.

Referring now to FIG. 3, there is illustrated a flow chart of one methodology for cluster debugging and distributed applications in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 300, a user creates a debugging expression that comprises a tracepoint and/or constraint breakpoint expression via the UI engine. The tracepoint and/or constraint breakpoint expression is transmitted from the UI engine to the SCE, as indicated at 302. At 304, the SCE parses the expression into log and constraint expressions for static information, preprocesses the static information, and sends parts thereof to corresponding DCEs of processes to be debugged (as indicated in the static information). At 306, the DCE registers a received constraint as a breakpoint in the corresponding process. The breakpoint is then monitored for a breakpoint event, as indicated at 308. If no event is received the DCE continues to monitor the process as indicated by flow back to the input of 308. If an event is detected, at 310, the DCE evaluates the remainder of the expression on the received dynamic data. At 312, based upon the dynamic data, a log is sent to the UI engine for at least presentation to the user and storage, and either the break data is determined to be sent back to the UI engine or ignored.

Figure 4:
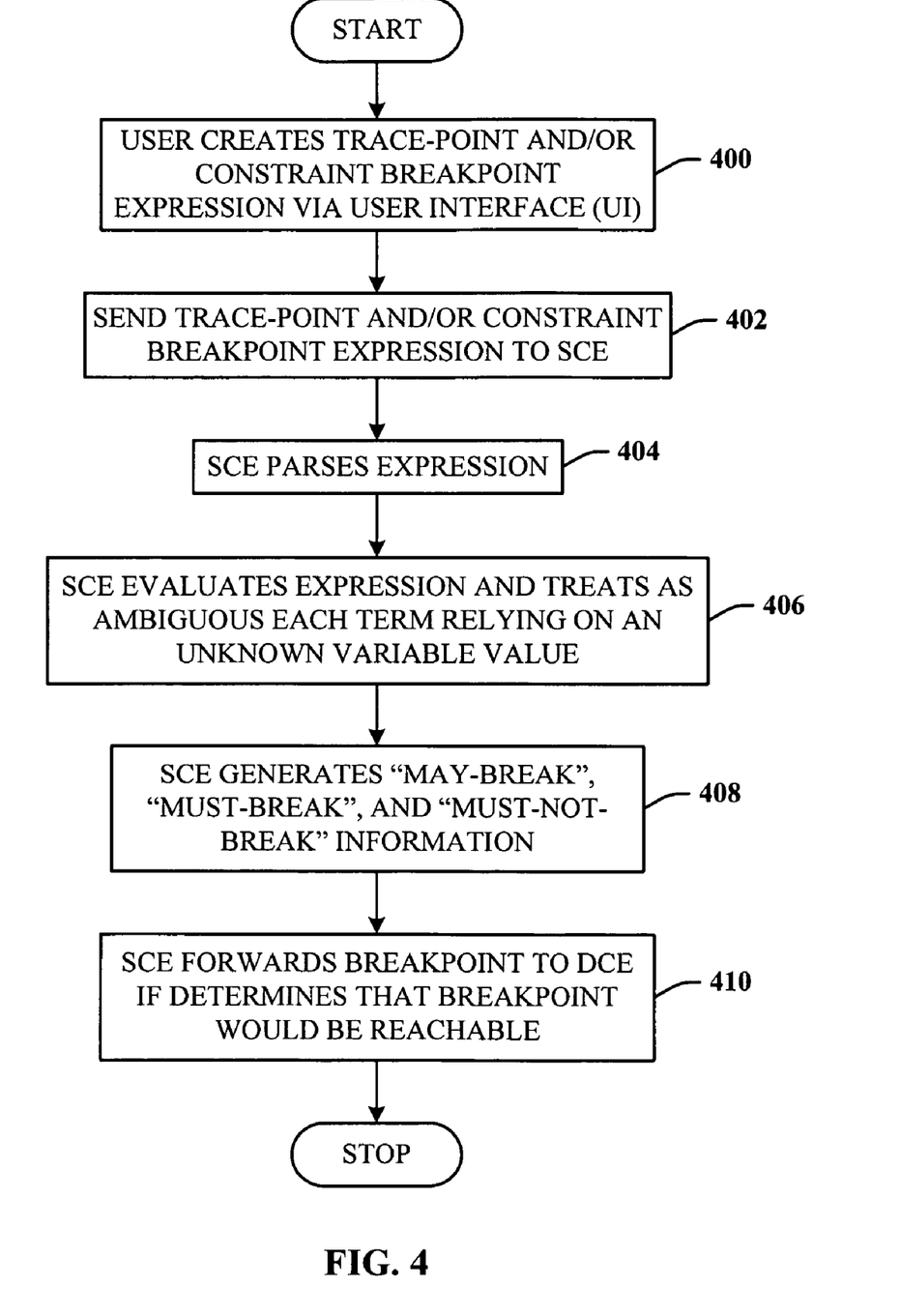
FIG. 4 illustrates a flow chart of one methodology of static constraint engine processing in accordance with the invention.

Referring now to FIG. 4, there is illustrated a flow chart of one methodology of static constraint engine processing in accordance with the invention. At 400, the user creates a tracepoint and/or constraint breakpoint expression via the debugging engine UI. At 402, the expression is sent to the SCE. The SCE then parses the expression to obtain static information and other information that defines to which DCEs further interfacing is directed, as indicated at 404. At 406, the SCE evaluates the expression and treats as ambiguous each term that relies on a variable value that is yet unknown.

At 408, the SCE generates a may-break, must-break, and must-not-break information in accordance with corresponding processes to be debugged. For example, it is to be appreciated that during cluster computing, an application can be executing on a plurality of the cluster nodes (or machines). The application can include a number of different running processes: first and second processes running on a first machine, a third process running on a second machine, and fourth process running on a third machine. The debugging architecture of the invention minimizes the impact on the application by further reducing the interruption to the running processes. Thus, at 410, the SCE only forwards a breakpoint to the DCE when it is determined that the corresponding breakpoint would be reachable for the associated process. In another implementation, the breakpoint is only transmitted to the DCE if the interruption to the running application, as a whole, is below a predetermined interruption value.

Figure 5:
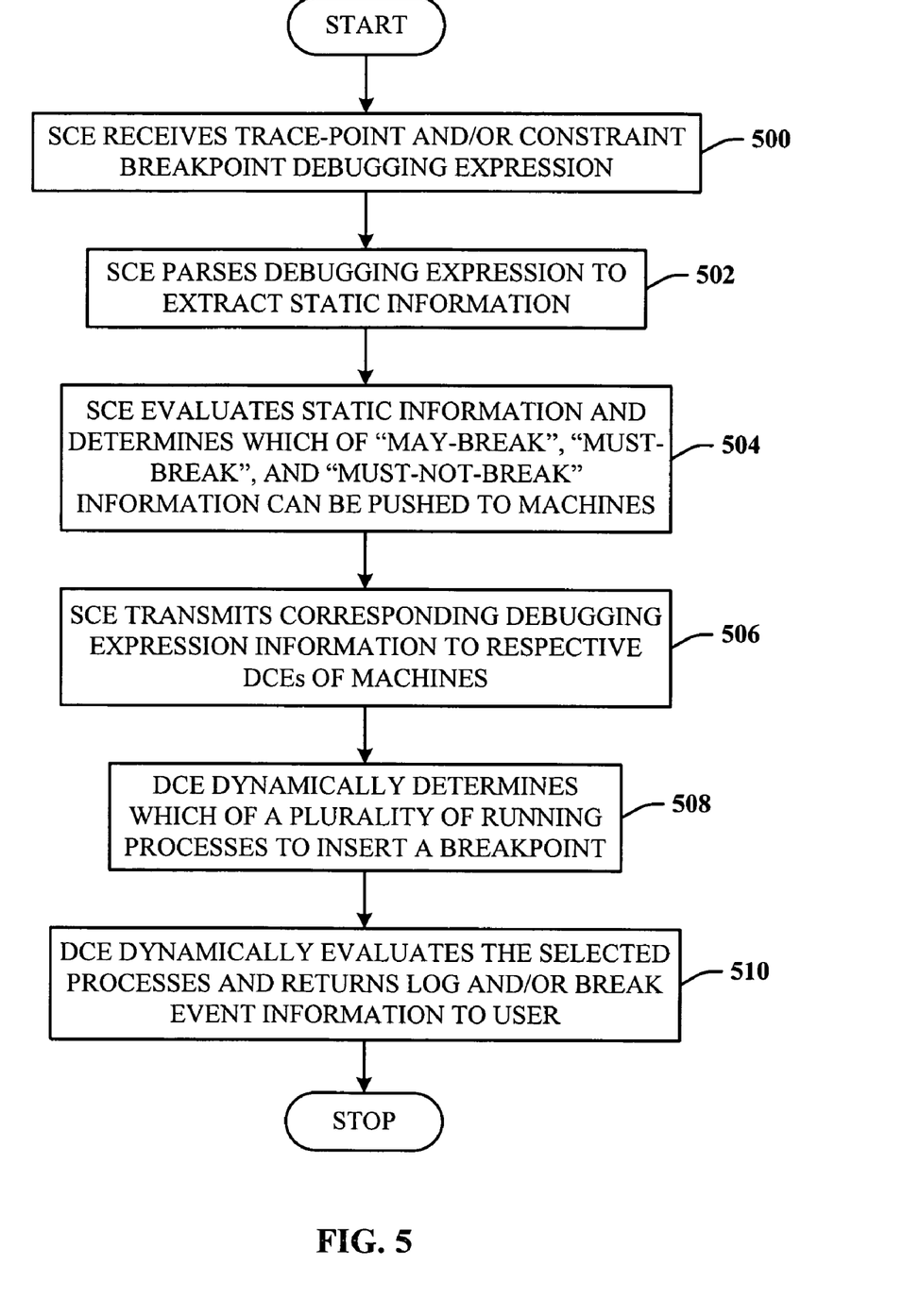
FIG. 5 illustrates a flow chart of one methodology of SCE/DCE interaction in accordance with the invention.

Referring now to FIG. 5, there is illustrated a flow chart of one methodology of SCE/DCE interaction in accordance with the invention. At 500, the SCE receives a tracepoint and/or constraint breakpoint debugging expression. At 502, the SCE parses the debugging expression to extract static information. At 504, the SCE evaluates the static information and determines which of a may-break, must-break, and must-not-break information can be pushed to which machines of the cluster. At 506, the SCE transmits the debugging expression information to the corresponding DCEs of the machines. At 508, the DCE of a machine dynamically determines which of a possible plurality of running processes to insert a breakpoint. At 510, the DCE dynamically evaluates the selected processes and returns log and/or break event information to the UI engine for presentation to the user.

Figure 6:
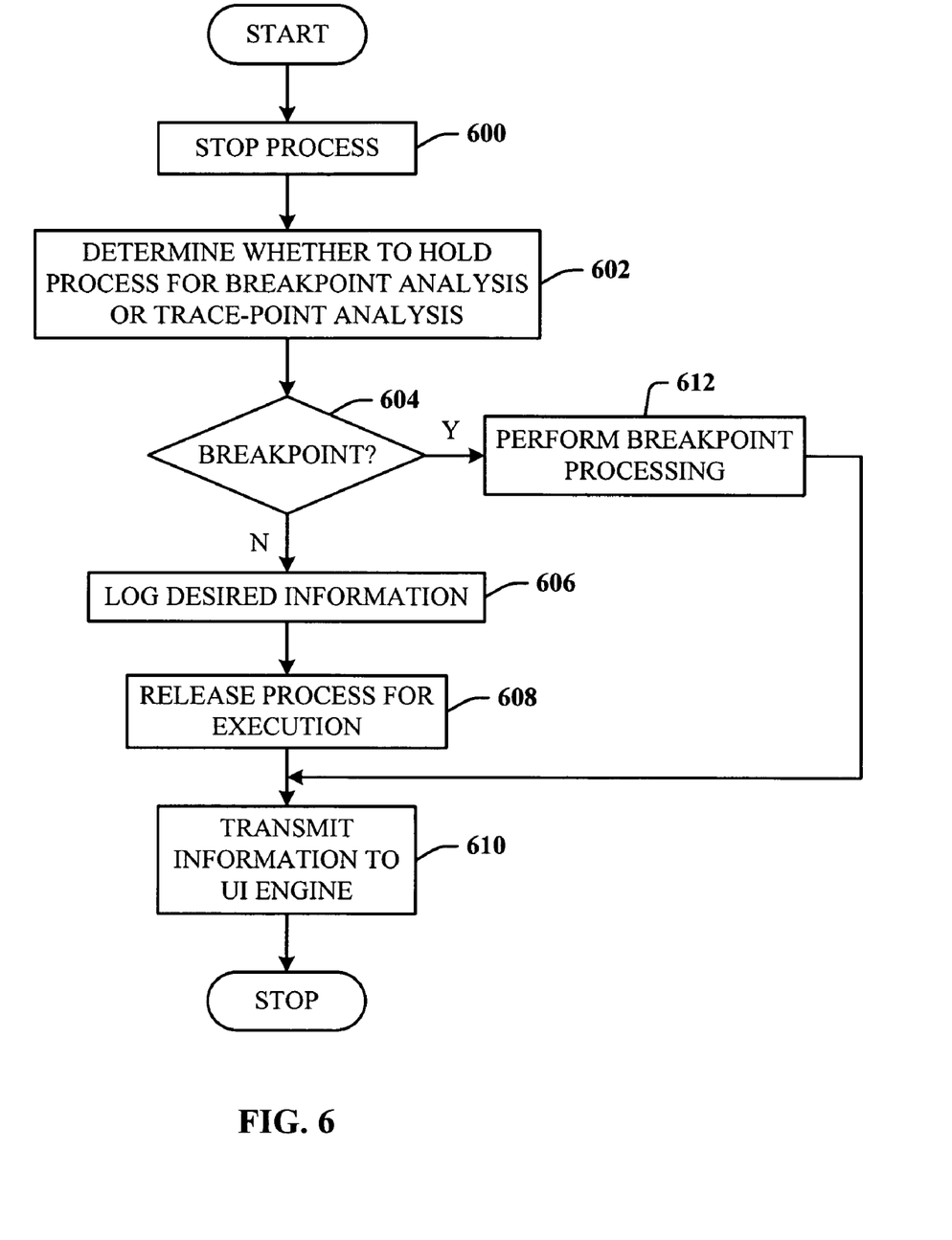
FIG. 6 illustrates a methodology of logging and breakpoint analysis is provided in accordance with the subject invention.

Referring now to FIG. 6, a methodology of logging and breakpoint analysis is provided in accordance with the subject invention. At 600, a machine process is stopped. At 602, the system determines whether to hold the process for breakpoint analysis or tracepoint analysis. At 604, if breakpoint analysis is not desired, flow is to 606 to log the desired information. At 608, the process is then released for execution. At 610, the logged information is then transmitted back to the UI engine. On the other hand, if breakpoint analysis is desired, flow proceeds from 604 to 612 to perform breakpoint analysis. The breakpoint analysis information is then transmitted back to the UI engine, as indicated by progressing to 610.

Figure 7:
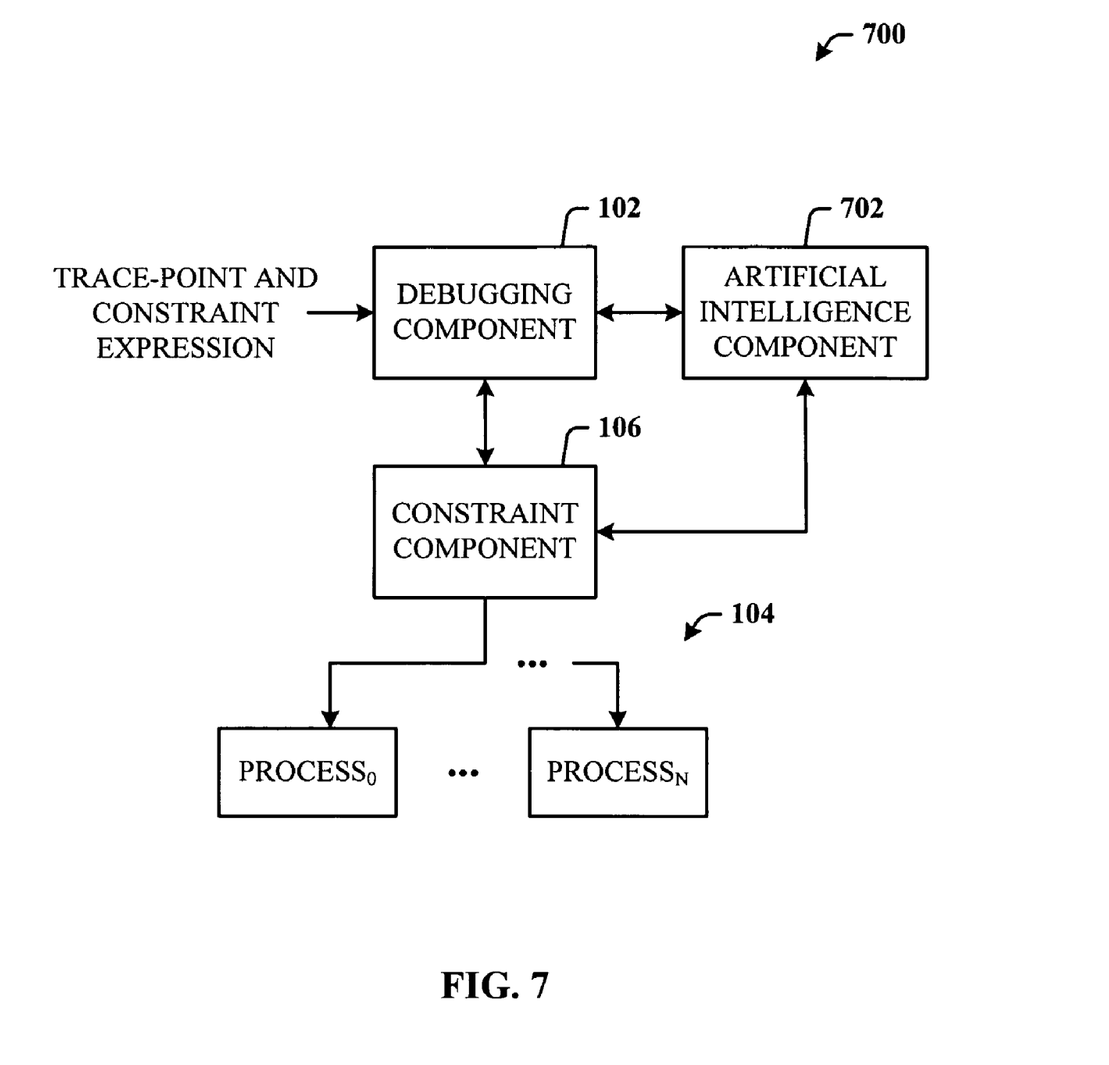
FIG. 7 illustrates a system that facilitates cluster computing debugging and distributed applications in accordance with the subject invention by further employing an artificial intelligence component.

Referring now to FIG. 7, there is illustrated a system 700 that facilitates cluster computing and distributed applications debugging in accordance with the subject invention by further employing an artificial intelligence (AI) component 702. The AI component 702 can interface to either or both of the debugging component 102 and the constraint component 106 to facilitate feature automation in accordance with the invention. The subject invention (e.g., in connection with breakpoint determination) can employ various AI-based schemes for carrying out various aspects thereof. For example, a process of determining where to place breakpoints in a given process or program can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to determining where to place breakpoints in a parallel application, where to place tracepoints in the application, using either or both of the placed tracepoints or/and breakpoints to analyze and understand the application according to throughput, for example. Such tracepoint and breakpoint insertion can be performed by the DCE.

In another implementation, the AI can be used to determine optimum (or minimum) process interruption time for any single process or thread of the parallel application such that program interruption is minimized. For example, if breakpoint analysis of a first process and a second process is desired, the AI component 702 can automatically make a determination to perform only breakpoint processing on the second process if the similar processing on both the processes would exceed a predetermined interruption time.

Alternatively, the AI component 702 could determine to employ tracepoint processing, rather than breakpoint processing on the first process in order to at least gather log information about the first process. Breakpoint processing could still be performed on the second process. Such determinations can be made by the AI component 702 facilitating program understanding by first performing breakpoint and/or tracepoint insertions during a "calibration" phase. Thereafter, such program calibration information can be utilized to determine automatically whether to employ tracepoint and/or breakpoint processing on various separate processes running on several different machines by estimating the interruption time for each process according to the calibration information.

Figure 8:
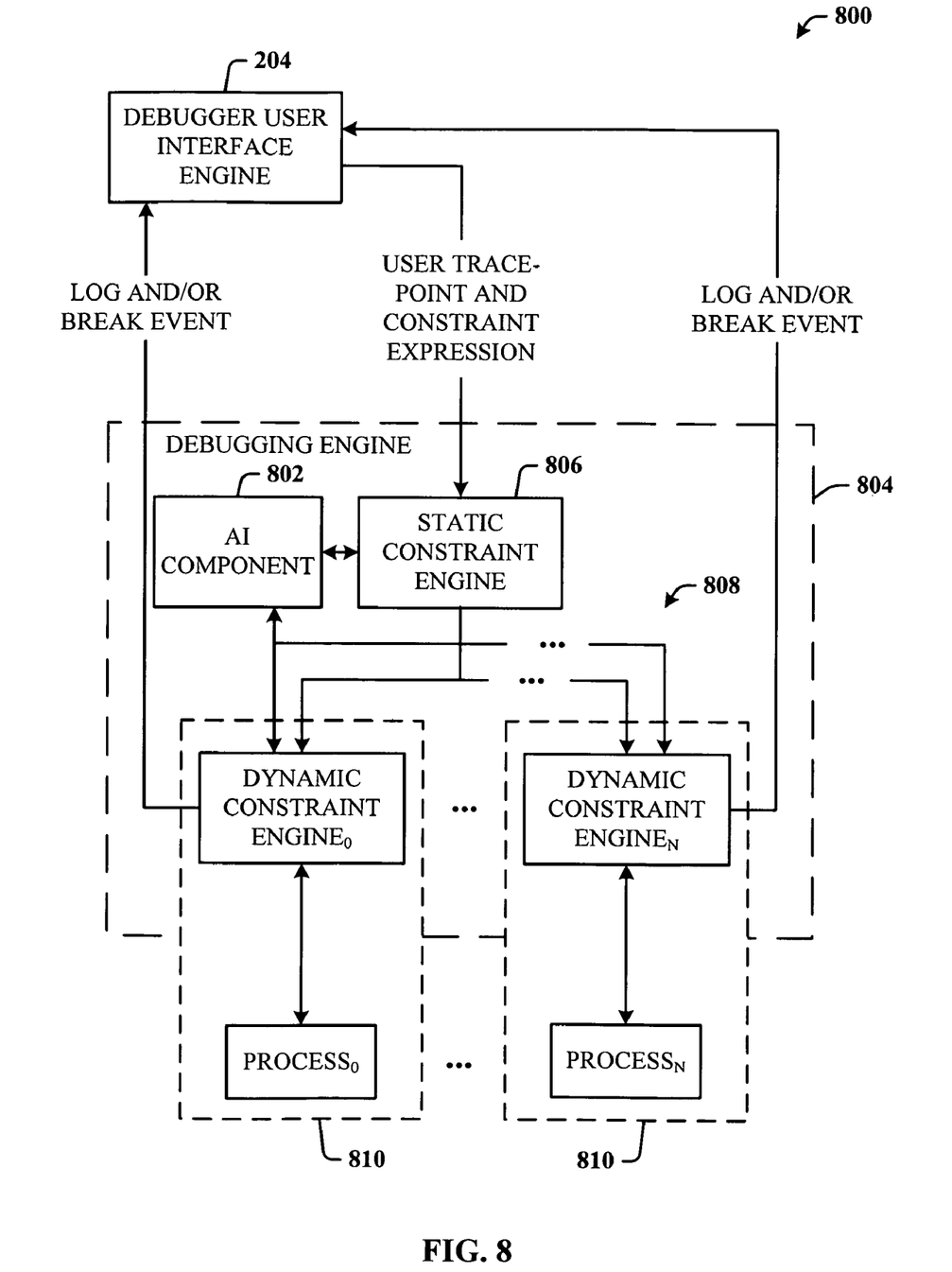
FIG. 8 illustrates a system that facilitates cluster computing debugging and distributed applications in accordance with the subject invention by further employing an AI component.

Referring now to FIG. 8, there is illustrated a system 800 that facilitates cluster computing and distributed applications debugging in accordance with the subject invention by further employing an AI component 802 (similar to AI component 702 of FIG. 7). The system 800 employs the AI component 802 as part of a debugging engine 804. The AI component 802 interfaces to the SCE 806 and each of DCEs 808 to facilitate learning and automation of one or more features associated therewith, and according to the description of the AI component 702 supra. Here, the debugging engine 804 interfaces with N machines 810 each associated with corresponding ones of the DCEs 808. The DCEs 808 communicate with one or more processes on each of the respective machines 810. In one implementation of the AI component 802, the DCEs can be employed to automatically insert tracepoints in the application processes to better understand the application, and from this, determine software help metrics on the application by looking at its throughput.

Figure 9:
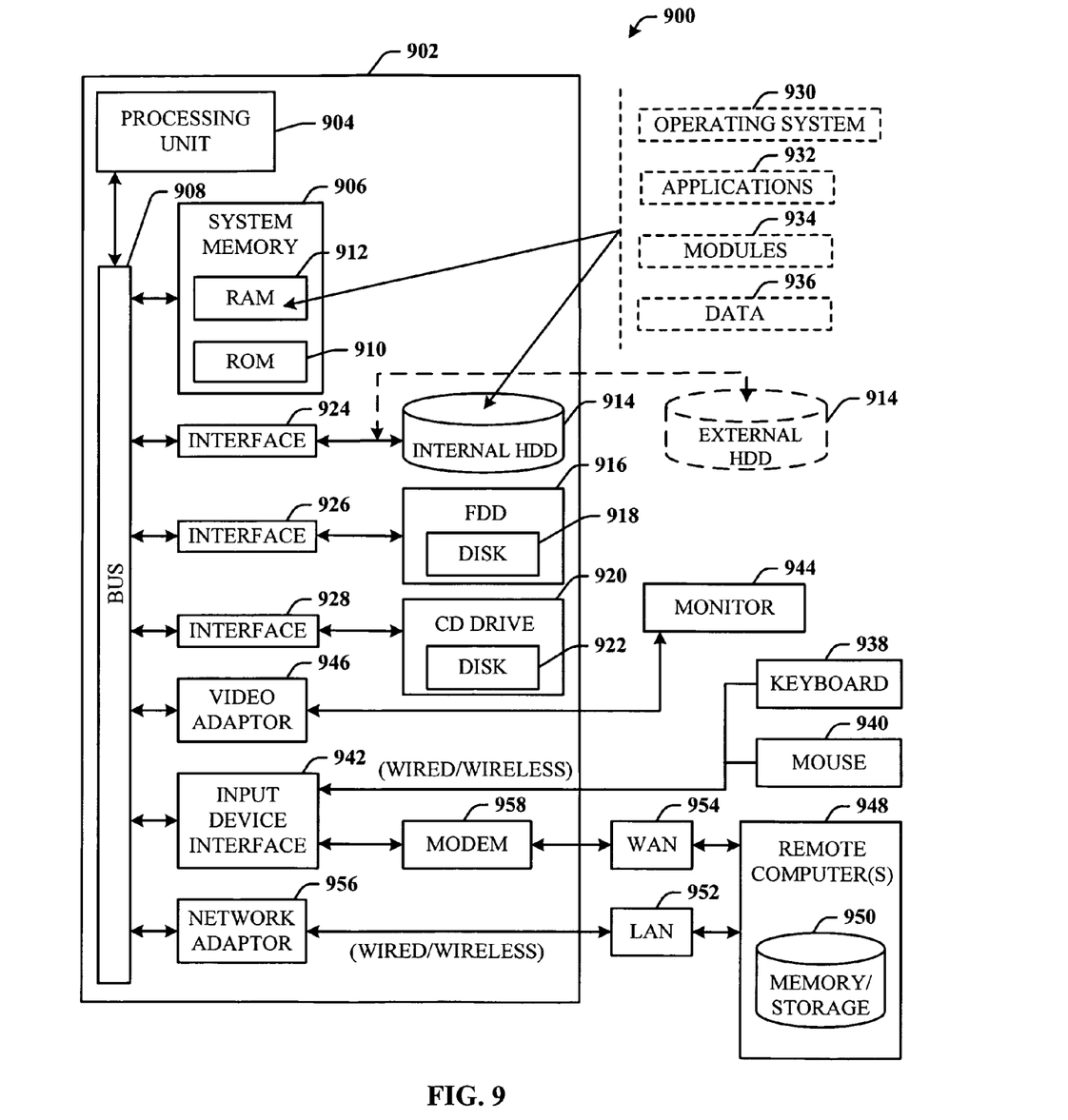
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects of the subject invention, FIG. 9 and the following discussion are intended to provide a brief, general description of a suitable computing environment 900 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, there is illustrated an exemplary environment 900 for implementing various aspects of the invention that includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the invention can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
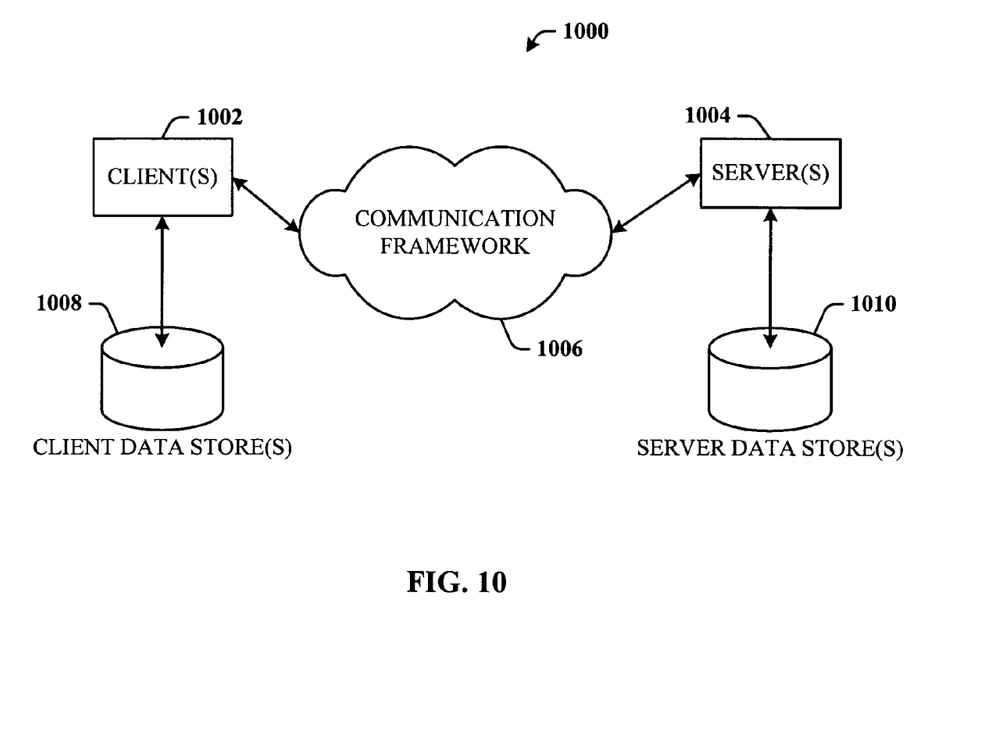
FIG. 10 illustrates a schematic block diagram of an exemplary computing environment in accordance with the subject invention.

Referring now to FIG. 10, there is illustrated a schematic block diagram of an exemplary computing environment 1000 in accordance with the subject invention. The system 1000 includes one or more client(s) 1002. The client(s) 1002 can be hardware and/or software (e.g., threads, processes, computing devices). The client(s) 1002 can house cookie(s) and/or associated contextual information by employing the invention, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates debugging an application with parallel processes running on several machines in a computing cluster or distributed applications environment, the system comprising:

a memory;

a plurality of machines, which are executing the application in parallel;

a plurality of application processes, running in parallel, including at least one application process running on each of the plurality of machines;

a debugger user interface engine;

a debugging engine that receives a debugging expression from the debugger user interface engine and that transmits log data and break event data back to the debugger user interface engine, wherein the received debugging expression comprises at least one of a tracepoint expression and a constraint expression, wherein the debugging engine processes the debugging expression to automatically perform a debugging process on at least two application processes of the plurality of application processes, and wherein the debugging engine comprises a static constraint engine; and a plurality of dynamic constraint engines that interface to the static constraint engine, wherein for each machine of the plurality of machines there is at least one corresponding dynamic constraint engine, and wherein each of the plurality of dynamic constraint engines is associated with one or more of the at least one application processes running on the machine;

wherein when a user creates the debugging expression via the debugger user interface, the debugging expression is sent directly to the static constraint engine;

wherein the static constraint engine receives and parses the debugging expression, reducing the expression by evaluating parts of the expression based on static values, extracting static information, and treating as ambiguous any term that relies on a variable whose value is not yet known, wherein the static constraint engine automatically generates, for the received debugging expression, breakpoint information corresponding to a breakpoint or a tracepoint, wherein the breakpoint information includes may-break/must-break/must-not-break information, and the static constraint engine forwards the breakpoint information to at least one selected dynamic constraint engine of the plurality of dynamic constraint engines when it is determined that the breakpoint or tracepoint is reachable by the one or more application processes associated with the selected dynamic constraint engine, such that the static constraint engine does not forward the breakpoint information to the selected dynamic constraint engine when the breakpoint or tracepoint is unreachable by the one or more associated application processes, and further wherein the static constraint engine forwards the breakpoint information to the selected dynamic constraint engine when interruption to the running application, as a whole, is below a predetermined interruption value, and wherein the selected dynamic constraint engine, upon receiving the breakpoint information from the static constraint engine, registers the corresponding breakpoint or tracepoint at one or more applicable locations in at least one of the one or more associated application processes, and wherein, the selected dynamic constraint engine, upon receiving a breakpoint event from one of the one or more associated application processes, evaluates dynamically the breakpoint event in light of the breakpoint information, wherein the selected dynamic constraint engine dynamically performs one of (i) applying the tracepoint to minimize a stop time associated with stopping the application process, sending a log back to the user interface engine for at least presentation to the user and storage, or (ii) applying the breakpoint and returning break event information to the user interface engine for presentation to the user.

2. The system of claim 1, wherein the one or more application processes associated with the selected dynamic constraint engine comprise a plurality of processes, and wherein the selected dynamic constraint engine processes the received breakpoint information to determine on which of the plurality of associated processes the debugging process will be performed.

3. The system of claim 1, wherein the debugger user interface engine receives at least one of log and breakpoint data from the plurality of application processes.

4. The system of claim 3, wherein the at least one of log and breakpoint data is transmitted asynchronously back to the debugger user interface engine.

5. The system of claim 1, further comprising an artificial intelligence component that interfaces to the static constraint engine and the plurality of dynamic constraint engines to facilitate automation that employs a probabilistic and/or statistical-based analysis to prognose or infer where to place breakpoints in a given process.

6. The system of claim 1, wherein the selected dynamic constraint engine is part of an operating system.

7. The system of claim 1, wherein the computing cluster or distributed applications environment is a computing cluster and wherein the plurality of machines are cluster machines, each having a processor and a memory.

8. The system of claim 1, wherein when the debugging engine processes the debugging expression to automatically perform the debugging process on the at least two application processes of the plurality of application processes, the at least two application processes are processes running on at least two different machines of the plurality of machines.

9. In a computing cluster or distributed applications environment that includes a plurality of processing units with corresponding memories, a method of debugging a parallel application that is running with a plurality of parallel application processes across a plurality of machines, including at least one application process on each machine, the method comprising:

generating, at a debugger user interface engine, a debugging expression that includes at least one of a tracepoint expression corresponding to a tracepoint and a breakpoint expression corresponding to a breakpoint;

receiving the debugging expression at a debugging engine, wherein the debugging engine comprises a static constraint engine and a plurality of dynamic constraint engines that interface to the static constraint engine, wherein for each machine of the plurality of machines there is at least one corresponding dynamic constraint engine of the plurality of dynamic constraint engines, and wherein each dynamic constraint engine is associated with one or more of the at least one application processes running on the machine;

processing the debugging expression at the static constraint engine, wherein said processing includes
extracting static information and non-static information from the debugging expression, wherein static information defines select ones of the plurality of machines on which a debugging operation is to be performed;
treating as ambiguous any term in the debugging expression that relies on a variable whose value is not yet known; and
generating breakpoint information for the debugging expression corresponding to at least one of the breakpoint and the tracepoint, including may-break/must-break/must-not-break information;

forwarding, for each machine of the select ones of the machines, the breakpoint information from the static constraint engine to at least one selected dynamic constraint engine corresponding to the machine, when it is determined (i) that the breakpoint or the tracepoint is reachable by the one or more application processes associated with the selected dynamic constraint engine, such that breakpoint information is not forwarded to the selected dynamic constraint engine when the breakpoint or tracepoint is unreachable by the one or more associated application processes, and (ii) that interruption to the running application, as a whole, is below a predetermined interruption value; and performing, in parallel, the debugging operation on a plurality of application processes corresponding to the select ones of the machines.

10. The method of claim 9, further comprising transmitting debugging results back to the debugger user interface engine for presentation to a user.

11. The method of claim 9, further comprising determining whether to employ at least one of the tracepoint and the breakpoint based upon interruption time information.

12. The method of claim 9, further comprising applying the tracepoint to minimize a stop time associated with stopping a process of the parallel application.

13. The method of claim 12, further comprising transmitting asynchronously to the debugger user interface engine log information associated with the act of applying the tracepoint.

14. The method of claim 13, further comprising determining whether to show break information via the debugger user interface engine or ignore it.

15. The method of claim 9, further comprising processing the non-static information against dynamic data received from the debugging operation on the plurality of application processes.

16. The method of claim 15, wherein the dynamic data include at least one of a thread ID, a call-stack location, and a user variable.

17. The method of claim 9, wherein for performing, in parallel, the debugging operation on a plurality of application processes corresponding to the select ones of the machines comprises, for each process,
registering, by means of the dynamic constraint engines associated with the processes, a breakpoint at an applicable location in one or more of the application processes;
receiving, at the associated dynamic constraint engine, a breakpoint event from a corresponding application process of the application processes;
evaluating dynamically the breakpoint event in light of the breakpoint information; and
applying, based on the dynamic evaluation of the breakpoint event, one of a tracepoint expression to minimize a stop time associated with stopping the application process, wherein a log is sent back to the user interface engine for at least presentation to the user and storage, or a breakpoint expression, returning break event information to the user interface engine for presentation to the user.

18. The method of claim 17, wherein the corresponding application process is stopped when the breakpoint event from the process is received; and wherein evaluating dynamically the breakpoint event comprises determining whether to hold the process for breakpoint analysis or tracepoint analysis, and wherein if it is determined that tracepoint analysis should be employed, applying the tracepoint expression comprises logging desired tracepoint information, releasing the process for execution and transmitting the logged tracepoint information back to the debugging user interface engine, whereas, if it is determined that breakpoint analysis should be employed, applying the breakpoint expression comprises performing breakpoint analysis and transmitting breakpoint event information back to the debugger user interface engine.

19. The method of claim 9, further comprising implementing, with an AI component comprising an automatic classifier system and process, with the AI component interfaced to the static constraint engine and plurality of dynamic constraint engines, an AI based scheme to determine where to automatically place breakpoints, wherein the automatic classifier system uses a classifier function that maps an input attribute vector to a confidence that the input belongs to a class in order to employ a probabilistic and statistical-based analysis to prognose and infer where breakpoint should be placed.

20. The method of claim 19, wherein the automatic classifier system further comprises a support vector machine that is trained in a training phase with training data, wherein the trained support vector machine is used to automatically prognose and infer where the breakpoint should be placed by finding a hypersurface in the space of possible inputs and attempting to split triggering criteria from non-triggering events to make classifications for testing data that is near, but not identical to training data.

21. The method of claim 9, further comprising
implementing, using an AI component comprising an automatic classifier system and process, with the AI component interfaced to the static constraint engine and plurality of dynamic constraint engines, an AI based scheme to determine optimal minimum process interruption time for any single process of the parallel application such that program interruption is minimized, and determining automatically whether to employ tracepoint or breakpoint processing on the plurality of the application processes running on two or more of the plurality of machines, wherein the AI component first obtains program calibration information by performing breakpoint and tracepoint insertions during a calibration phase and then uses the program calibration information to make the automatic determination of whether to employ tracepoint or breakpoint processing by estimating the interruption time for each process according to the calibration information.

22. A computer program product, comprising one or more computer-readable computer storage media, that when executed by one or more processors of one or more computing systems, causes the one or more computing systems to perform at least the following:
generate, at a debugger user interface engine, a debugging expression that includes at least one of a tracepoint expression corresponding to a tracepoint and a breakpoint expression corresponding to a breakpoint;
receive the debugging expression at a debugging engine, wherein the debugging engine comprises a static constraint engine and a plurality of dynamic constraint engines that interface to the static constraint engine, wherein for each machine of the plurality of machines there is at least one corresponding dynamic constraint engine of the plurality of dynamic constraint engines, and wherein each dynamic constraint engine is associated with one or more of the at least one application processes running on the machine;
process the debugging expression at the static constraint engine, wherein said processing includes
extracting static information and non-static information from the debugging expression, wherein static information defines select ones of the plurality of machines on which a debugging operation is to be performed;
treating as ambiguous any term in the debugging expression that relies on a variable whose value is not yet known; and
generating breakpoint information for the debugging expression corresponding to at least one of the breakpoint and the tracepoint, including may-break/must-break/must-not-break information;
forward, for each machine of the select ones of the machines, the breakpoint information from the static constraint engine to at least one selected dynamic constraint engine corresponding to the machine when it is determined (i) that the breakpoint or the tracepoint is reachable by the one or more application processes associated with the selected dynamic constraint engine, such that breakpoint information is not forwarded to the selected dynamic constraint engine when the breakpoint or tracepoint is unreachable by the one or more associated application processes, and (ii) that interruption to the running application, as a whole, is below a predetermined interruption value; and
perform, in parallel, the debugging operation on a plurality of application processes corresponding to the select ones of the machines.

* * * * *